(12) United States Patent
Obara et al.

(10) Patent No.: US 6,971,797 B2
(45) Date of Patent: Dec. 6, 2005

(54) LINEAR MOTION GUIDE UNIT WITH MEANS FOR KEEPING CAGE AGAINST WOBBLING

(75) Inventors: Kouji Obara, Kanagawa-ken (JP); Shigeki Kakei, Gifu-ken (JP)

(73) Assignee: Nippon Thompson Co., Ltd., Tokyo (JP)

( * ) Notice: Subject to any disclaimer, the term of this patent is extended or adjusted under 35 U.S.C. 154(b) by 144 days.

(21) Appl. No.: 10/717,572

(22) Filed: Nov. 21, 2003

(65) Prior Publication Data

US 2004/0156565 A1     Aug. 12, 2004

(30) Foreign Application Priority Data

Dec. 19, 2002 (JP) .............................. 2002-367596

(51) Int. Cl.[7] ............................................. F16C 19/36
(52) U.S. Cl. .......................................... 384/47; 384/59
(58) Field of Search .............................. 384/47, 59, 49, 384/50, 54

(56) References Cited

U.S. PATENT DOCUMENTS

| | | |
|---|---|---|
| 2,866,505 A | 12/1958 | Forkner |
| 3,857,618 A | 12/1974 | Hagen et al. |
| 3,975,063 A | 8/1976 | Mahotka et al. |
| 5,076,715 A | 12/1991 | Saoyama et al. |
| 5,427,454 A | 6/1995 | Tsuboi |

FOREIGN PATENT DOCUMENTS

| | | |
|---|---|---|
| DE | 75 07 730 U | 12/1975 |
| DE | 42 17 663 A | 12/1992 |
| EP | 1 277 976 A2 | 1/2003 |
| EP | 1 319 852 A2 | 6/2003 |
| JP | 60-4618 A | 1/1985 |
| JP | 24318/1991 | 2/1991 |
| JP | 91445/1995 | 4/1995 |
| JP | 108056/1999 | 4/1999 |
| JP | 2003-28157 | 1/2003 |

*Primary Examiner*—Lenard A. Footland
(74) *Attorney, Agent, or Firm*—Browdy and Neimark, PLLC

(57) ABSTRACT

A linear motion guide unit where there is provided a tiny mechanism to keep a cage retaining therein more than one rolling element against wobbling. The cage retaining rolling elements holds therein a pinion, which mates with racks lying in the raceway grooves. A pinion holder is allowed to snap into a hook hole formed in the cage. To this end, the pinion holder has a flange extending out of any side of the pinion holder so as to come into abutment against any one surface of an edge around the hook hole, and an snap hook extending out of the other side of the pinion holder to come into engagement with another surface of the edge around the hook hole.

15 Claims, 9 Drawing Sheets

LINEAR MOTION GUIDE UNIT WITH MEANS FOR KEEPING CAGE AGAINST WOBBLING

FIELD OF THE INVENTION

The present invention relates generally to a linear motion guide unit adapted for use in a variety of machinery including semiconductor manufacturing machines, precision measuring instruments, precision inspection equipment, precision assembly machines, industrial robots or the like and, more particularly, to a linear motion guide unit that is provided therein with means for keeping a cage against wobbling.

BACKGROUND OF THE INVENTION

In recent years, linear motion guide units of the type hereinafter referred to as "finite linear motion guide unit" because of their construction where rolling elements are allowed to roll over only a definite travel instead of rolling through a recirculating circuit have been used extensively in diverse fields of machinery including semiconductor manufacturing machines, precision measuring instruments, precision inspection equipment, precision assembly machines, and so on to move a component along a linear way relatively to any counterpart. Correspondingly, the finite linear motion guide units of the sort recited just above are seeing growing demands for high speed operation and high acceleration/deceleration between the components allowable to move relatively to one another, with even made slim or compact in construction. At the same time the advanced machinery expects the finite linear motion guide units to be operated with high precision and low-frictional resistance, and so on. Solving the issues stated earlier is needed for further development of the linear motion guide units.

Conventionally, there are known to a finite linear motion guide unit of the type recited earlier, which has incorporated therein with a finite linear motion guideway capable of keeping a cage or retainer against wobbling to make certain of relative travel between any guideway members movable relatively to one another. One example of the prior finite linear motion guide units so constructed as stated earlier is disclosed in Japanese Patent Laid-Open No. 108056/1999, in which cylindrical rollers held in a cage are placed for rolling motion between confronting raceway grooves formed on the guideway members, while a rack fit in a relief valley comes in mesh with a pinion supported for rotation on the cage. With the finite linear motion guide unit recited earlier, the teeth on the rack are made recessed to avoid any interference with the cylindrical rollers. This construction allows the rack of gear teeth to be made in a module large in size, thus increasing the strength in mesh with the pinion thereby to keep the cage against wobbling with respect to the associated guideway members. Moreover, as the relief valley cut in the raceway groove on the guideway member needs less space, the rack-and-pinion construction recited earlier can make sure of providing the guideway large in bearing surface.

In Japanese Patent Laid-Open No. 91455/1995, there is disclosed a rolling-contact bearing for a finite linear motion guide unit expected to control securely the relative travel of the raceway members. With this rolling-contact bearing for a finite linear motion guide unit, guideway members are arranged in parallel with each other with their raceway grooves lying in opposed relation. Racks are fit in relief valleys cut deep in the raceway grooves. A cage in which cylindrical rollers and pinions are assembled is installed between the raceway members in such a way that the pinions come in mesh with racks.

Another finite linear motion guide unit is disclosed in Japanese Patent Laid-Open No. 24318/1991, in which there is provided a rolling-contact bearing having a cage where a small gear or the pinion is fit integrally. In the finite linear motion guide unit in the third citation, the pinion is installed in the cage at the widthwise middle while racks are placed on the table and the bed, one to each, at the widthwise middle. To this end, the cage is made at the widthwise middle thereof with a hole extending lengthwise of the cage. There are provided bearing lugs below the inside surface of the cage along the widthwise opposing edges of the elongated hole. The bearing lugs are made with bearing areas open downwards to carry a pinion-shaft therein.

Most of prior finite linear motion guide units of the sort discussed here, nevertheless, requires preparing a variety of molds unique in size or dimension to every cage because there are provided in the cage the bearings in which the pinion-shaft fits integrally to be carried therein while the bearings are made integrally with the cage. Thus, it would be considered that this prior construction lacks universality flexible to the desired size. Moreover, the prior finite linear motion guide units are complicated in assembly of the pinion holder and correspondingly would often fail to certainly hold the pinion holder, and also very tough to shrink the guide unit itself down. With the conventional bearings for the finite linear motion guide unit recited earlier, in addition, the pinion holder, because of constructed to be held on engaging pawl in the cage, is difficult to set securely it to cage and, therefore, less in strength to hold securely the pinion.

To cope with the shortcomings stated just earlier, the present assignee has already filed a senior pending Patent Application in Japan, Japanese Patent Laid-Open No. 2003-28157, relating a finite linear motion guide unit in which the construction to keep the cage against wobbling can be installed by only somewhat modifying the conventional finite linear motion guide unit in construction. The finite linear motion guide unit of co-pending earlier application can be applied widely from large-sized tables to very small tables, dealing with the high-speed travel and acceleration/deceleration of the moving part or table, even with made compact or slim in construction and serving the function of low sliding resistance. With the finite linear motion guide unit of co-pending earlier application, the pinion holder has pins at four corners thereof, which fit in holes in the cage to support and locate the pinion holder on the cage, then followed by caulking the opposite ends of the pin to fasten firmly the pinion holder on the cage. Nevertheless, the finite linear motion guide unit of co-pending earlier application has to go through troublesome process of forming more than one pin in the pinion holder while making more than one hole in cage, and further caulking the tips of the pins to fasten firmly the pinion holder on the cage.

SUMMARY OF THE INVENTION

The present invention, therefore, has as its primary object to overcome the major problems discussed earlier in the finite linear motion guide units adapted for use in a variety of machinery including semiconductor manufacturing machines, precision machines, precision inspection equipment, precision assembly machines, machine tools, industrial robots or the like and, in particular to provide a finite linear motion guide unit with means for keeping a cage against any wobbling, which is made compact or slim in construction and also makes it possible to set simple the pinion holder to the cage. Moreover, the linear motion guide unit of the present invention helps make certain of the accurate travel of the moving part such as a table mounted on any guideway member, meeting demands for high speed operation and high acceleration/deceleration of the moving part or the table, with even made slim or compact in construction and also easier in installation of the means for keeping the cage against wobbling into the cage.

The present invention is concerned with a linear motion guide unit; comprising a pair of guideway members lying movable relatively to one another and having confronting raceway grooves on their sides extending in lengthwise direction, a cage retaining more than one rolling element in a raceway defined between the raceway grooves on the guideway members, the cage being made in a form of sheet extending the lengthwise direction, and means for keeping the cage against wobbling; wherein the means for keeping the cage against wobbling is comprised of a pinion holder fit in a hook hole in the cage after once having been made deformed, racks lying on the guideway members, and a pinion provided with teeth mating with the racks and installed in the cage for rotation.

In an aspect of the present invention, there is provided a linear motion guide unit in which the pinion holder is made therein with an aperture where a disc with teeth around there of the pinion is accommodated for rotation, and bearing recesses to carry loosely therein pinion shafts of the pinion for rotation.

In another aspect of the present invention, there is provided a linear motion guide unit in which the pinion holder has a flange extending out of a periphery of pinion holder to come into abutment against any one surface of an edge around the hook hole cut in the cage, and an snap hook extending from the periphery of the pinion holder to make engagement with another surface of the edge around the hook hole cut in the cage after deformation of the pinion holder. In greater detail, the pinion holder is made in a substantially rectangular configuration, which is defined by the periphery of a pair of lengthwise longer sides and a pair of shorter ends normal to the longer sides. The flange extends from any one of the longer side and shorter end at a level coming into abutment against any one surface or the reverse of the edge around the hook hole while the snap hook is out of the other at another level coming into engagement with another surface or the obverse of the edge around the hook hole. As an alternative, the linear motion guide unit may be such constructed that the flange extends from the other of the longer side and shorter end at said another level coming into abutment against the another surface or the obverse of the edge around the hook hole.

In another aspect of the present invention, a linear motion guide unit is provided in which the pinion holder is made with a working hole used to get the pinion holder deforming elastically so as to squish the aperture to snap the snap hook into engagement with the another surface or the obverse of the edge around the hook hole. Moreover, there is disclosed the pinion holder having a cavity next to the snap hook to make the snap hook ready to experience elastic deformation.

In another aspect of the present invention, a linear motion guide unit is provided in which the pinion is comprised of the disc which the successive teeth are positioned at a circular regular pitch around the disc to form slots each separating any two adjacent teeth, and the pinion shafts carried for rotation in the pinion holder to provide an axis about which the disc rotates.

In another aspect of the present invention, a linear motion guide unit is provided in which the racks lie lengthwise in relief valleys cut deep in the raceway grooves in the guideway members. Moreover, there is disclosed the rack composed of successive teeth spaced apart from each other at preselected intervals to allow the teeth to mesh with the pinion, and side walls extending in longitudinal direction on sidewise opposite sides of the teeth, one to each side, to connect the successive teeth together with one another.

In a further another aspect of the present invention, a linear motion guide unit is provided in which any one of the guideway members is a track rail while the other is a slide, both the track rail and the slider being made on their confronting surfaces with raceway grooves, which provide a pair of raceways allow the rolling elements running through there, and the cages to retain the rolling elements are placed in the raceways, one to each raceway, and joined together with a connecting web where there is provided the pinion holder for the means to keep the cage against wobbling. In another aspect of the present invention, there is provided a linear motion guide unit in which both the track rail and the slider are made with lengthwise recesses, which lie midway between the sidewise opposing raceways in opposition to one another to accommodate therein the racks for means to keep the cage against wobbling.

In another aspect of the present invention, a linear motion guide unit is provided in which the rolling elements are either cylindrical rollers or balls, which are allowed to run through over a pair of rolling-contact surfaces formed in the raceway grooves of the guideway members. Moreover, there is disclosed the guideway members having stoppers to keep the cage against falling away from the guideway members.

In a further another aspect of the present invention, there is provided a linear motion guide unit in which the guideway members have fastening means to mount any moving bodies including tables, mounting parts and so on or any stationary bodies including beds and so on thereon.

With the linear motion guide unit constructed as described earlier, there is less possibility of the cage getting wobbled or being off relatively to the guideway members and the cage causing easily any creeping at the bearings, so that the guideway members may be made certain of relative travel with precision between them. According to the finite linear motion guide unit of the present invention, moreover, the pinion holder can fit easily in the cage in simple snap-fit manner and also the pinion may be set simple into the cage. Moreover, the means for keeping a cage against any wobbling can be made compact or slim in construction. This helps expand useful applications of the finite linear motion guide with means to keep the cage against wobbling. With the pinion holder in which the snap hook extends from the longer side of the holder while the flange is out of the shorter end, the mold used to produce it may be made simple in construction, thus the precise holder may be prepared easily even with cost savings.

The finite linear motion guide unit constructed as stated earlier is applicable well for use in a variety of machinery including semiconductor manufacturing machines, precision machines, and so on. When the pinion holder gets fit in the cage, the process of simply setting the pinion holder to snap into the cage is sufficient. The pinion-and-rack arrangement providing the means to keep the cage against wobbling can be made reduced in the numbers of parts or components, correspondingly becoming small in size. The pinion holder can be produced with ease and used in a variety of finite linear motion guide units, helping extend the field of applications where the finite linear motion guide units are employed. In the linear motion guide unit of the present invention, the means to keep the cage against wobbling may be provided by the action of only fitting the pinion holder in the hook hole cut in the cage. Thus, the pinion-and-rack arrangement for providing the means to keep the cage against wobbling can be assembled with ease and precision even in the tiny linear motion guide units. The finite linear motion guide unit of the present invention helps make certain of the accurate relative travel between the moving parts such as tables fastened to the guideway members, meeting demands for high speed operation and high acceleration/deceleration of the moving parts or the tables, with even made slim or compact in construction, and at the same time helping serve useful functions such as low-frictional sliding resistance, and so on.

Other aspects, objects and advantages of the present invention can be obtained from a study of the drawings, the disclosure and the appended claims.

BEST MODE FOR CARRYING OUT THE INVENTION

Figure 1:
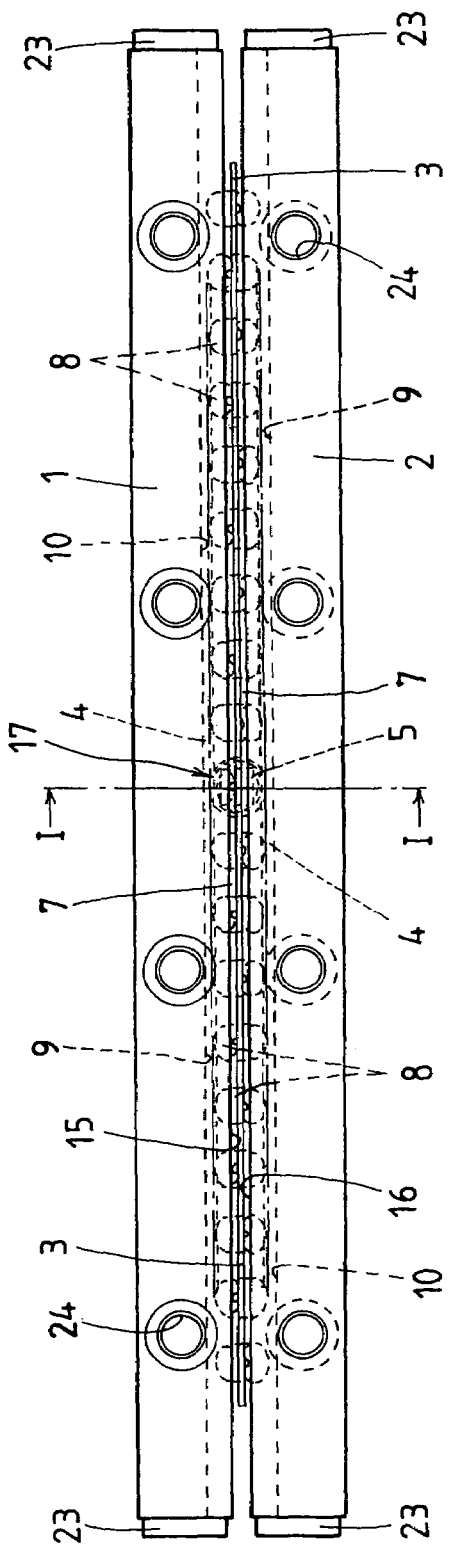
FIG. 1 is a front elevation showing a preferred embodiment of a finite linear motion guide unit having therein means for keeping a cage against any wobbling according to the present invention.
Figure 2:
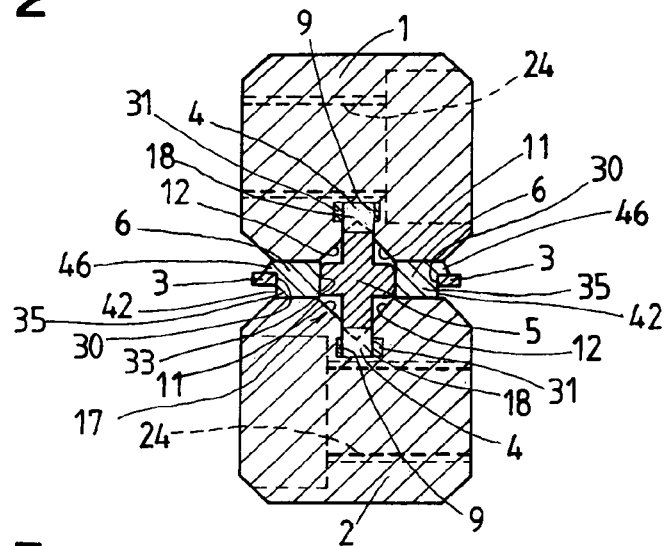
FIG. 2 is an enlarged traverse cross section taken along the plane lying on the line I—I of FIG. 1, where a pinion is placed in the finite linear motion guide unit shown in FIG. 1.

Embodiments of a finite linear motion guide unit with means for keeping a cage against wobbling according to the present invention will be described in detail with reference to the accompanying drawings. The finite linear motion guide unit discussed later is adapted for use in a variety of machinery including semiconductor manufacturing machines, precision measuring machines, precision inspection equipment, precision assembly machines, industrial robots, and so on. First of all, a preferred first embodiment of the finite linear motion guide unit of the present invention will be explained with reference to FIGS. 1 to 14. The finite linear motion guide unit includes guideway members 1, 2 having fastening means to mount any moving bodies including tables, mounting parts and so on or any stationary bodies including beds and so on thereon. The finite linear motion guide unit, as shown in FIGS. 1 and 2, is mainly comprised of a pair of guideway members 1, 2 arranged in opposition for linear movement relative to one another in such a way that their raceway grooves 10 cut in lengthwise surfaces 15, 16 are confronted with each other, more than one rolling element 8 disposed in a raceway 7 defined between the confronting raceway grooves 10 on the guideway members 1, 2 in a way running through along guideway surfaces 11, 12 defining the raceway grooves 10, a cage 3 in the form of plate to hold the rolling element 8, and a rack-and-pinion arrangement 17 that can work as the means for keeping the cage 3 against wobbling off between the confronting guideway members 1, 2. A pair of spaced parallel guideway members 1, 2 has the opposing raceway grooves 10 of rectangle in cross section cut in their lengthwise surfaces 15, 16 facing one another and more than one rolling element 8 of a cylindrical roller is interposed snugly between the opposing raceway grooves 10 for free rolling along the raceway 7. Thus, the guideway members 1, 2 are allowed to move with respect to each other along their longitudinal direction by virtue of the rollers 8.

The guideway members 1, 2 are each provided at forward and aft ends thereof with threaded holes (not shown), one to each end, into each of which fits an end screw 23 having a stopper head to keep the cage 3 from escape out of the associated guideway member 1, 2. Moreover, the guideway members 1, 2 are made lengthwise at preselected intervals with bolt holes 24 such as counterbores, threaded holes, and so on, which are used to fasten the guideway members 1, 2 to any other components, and combined together in a relation that they are turned around over 180 degrees with respect to each other, so that any one of the guideway members 1, 2 is fastened to the stationary side such as a machine bed, not shown, while another of the guideway members 1, 2 is connected to the moving side such as a table, not shown. Thus, the finite linear motion guide unit discussed here is used in such a fashion that a moving component such as a table and the like mounted on any one of the guideway members 1, 2 is allowed to travel relatively to the counterpart fastened to the stationary bed.

With the finite linear motion guide unit of the present invention, there is incorporated a rack-and-pinion mechanism 17 serving as means for keeping the cage 3 against wobbling off from the guideway members 1, 2. The rack-and-pinion mechanism 17 is mainly comprised of a pinion 5 held in a pinion holder 6 for free rotation, which fits in the cage 3, and racks 4 lying on the guideway members 1, 2, one to each guideway member. With the rack-and-pinion mechanism 17, the pinion holder 6 is made deformable in itself under compression so as to be allowed upon assembly to snap into hook hole 30 formed in the cage 3, while the pinion 5 is carried for rotation in the pinion holder 6 and provided around there with teeth 14 coming into mating with the racks 4 lying on the guideway members 1, 2. Thus, the pinion holder 6 is made engaged in the cage 3 in a snapped fit manner.

Figure 3:
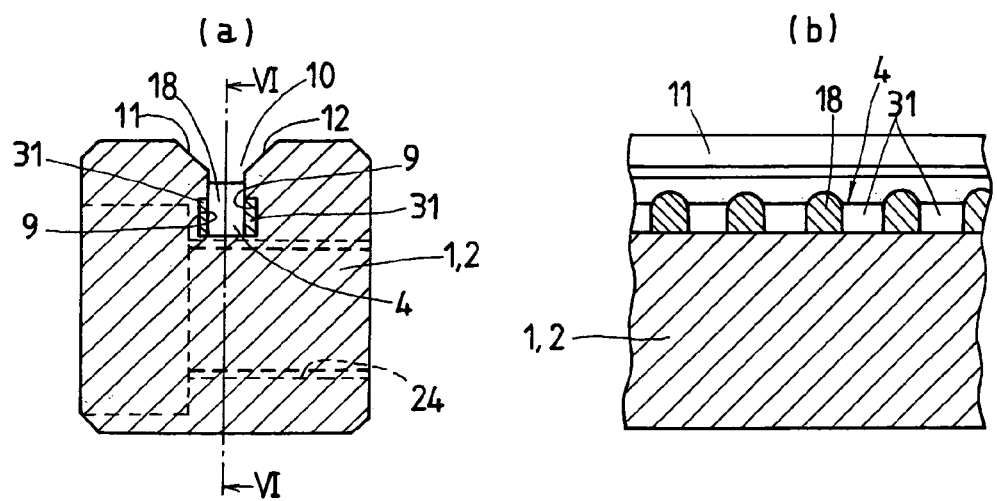
FIG. 3 is an illustration of any one of guideway members and a rack lying in the guideway member in the finite linear motion guide unit of FIG. 1, wherein (a) is an enlarged traverse cross section of the guideway member and (b) is a section taken along the plane lying on the line IV—IV of (a)

The racks 4, as shown in FIGS. 2 and 3, lie lengthwise in relief valleys 9 cut deep in the raceway grooves 10 in the guideway members 1, 2. Each rack 4 is made up of successive teeth 18 arranged in a way spaced apart from one another at preselected intervals, for example to mesh with the teeth on the pinion 5, and side walls 31 extending lengthwise of the rack 4 with flanking sidewise opposite ends of the teeth 18 to connect the successive teeth 18 with each other. In the embodiment shown in FIG. 1, the widthwise opposing side walls 31 are made different in thickness from one another. When the racks 4 identical in construction are laid in the guideway members 1, 2, therefore, the side walls 31 different in thickness from each other appear widthwise opposite between the confronting guideway members 1, 2. Moreover, although but the racks 4 are shown being each made up of just the successive teeth 18 and the side walls 31 connecting together the teeth 18, it will be appreciated that any bottom may be provided to connect together the side walls 31 to make sure of enough strength between any two of the successive teeth 18.

Figure 5:
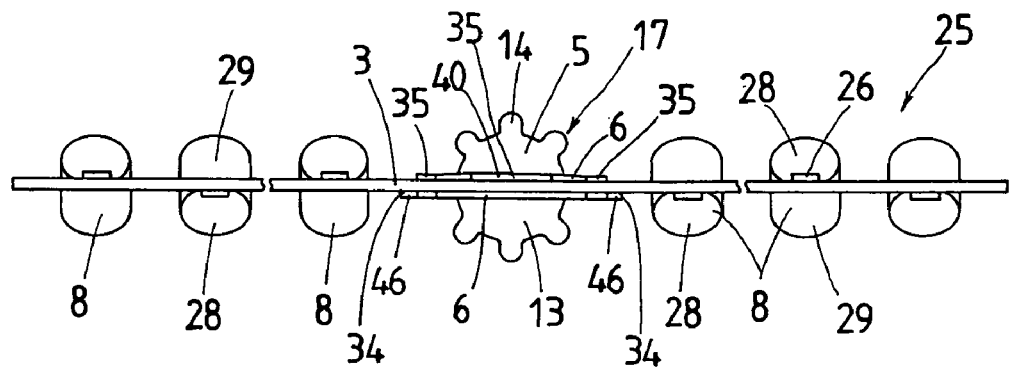
FIG. 5 is a front elevation of the cage assembly of FIG. 4.
Figure 6:
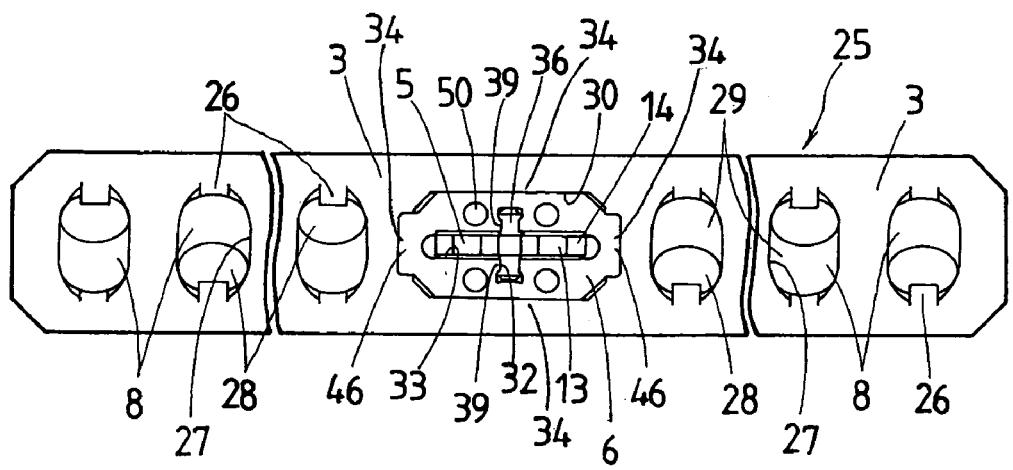
FIG. 6 is a bottom plan view of the cage assembly of FIG. 4.
Figure 7:
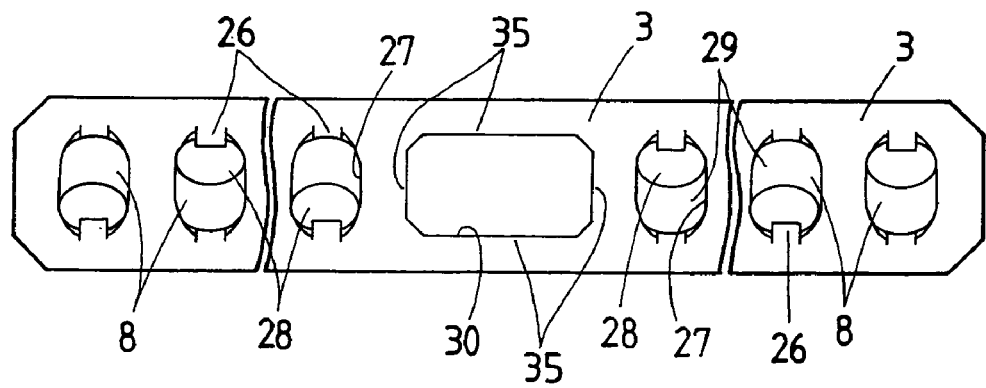
FIG. 7 is a top plan view similar to FIG. 4, but a pinion holder being shown removed from there.
Figure 8:
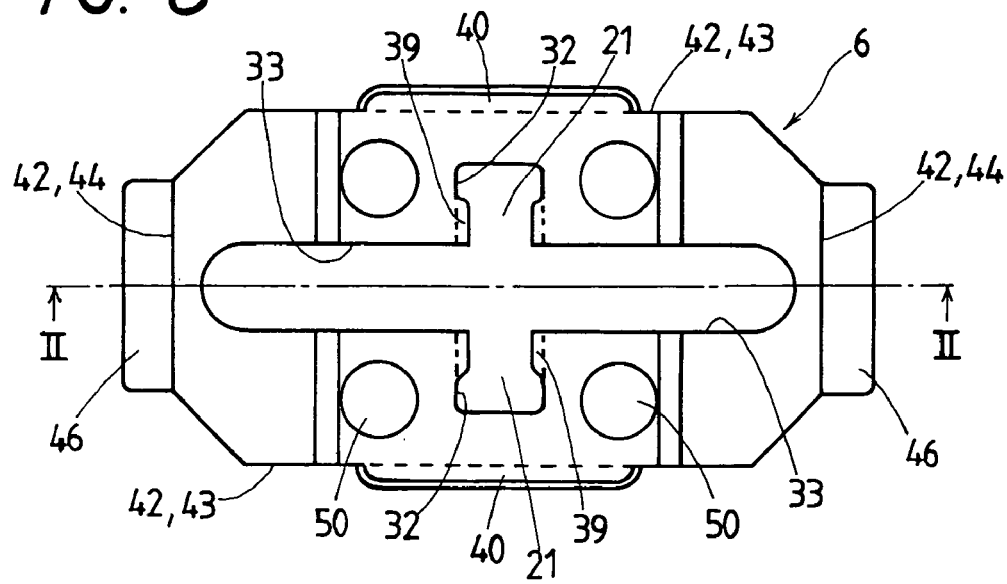
FIG. 8 is a top plan view showing the pinion holder to provide the means for keeping the cage against wobbling.
Figure 9:
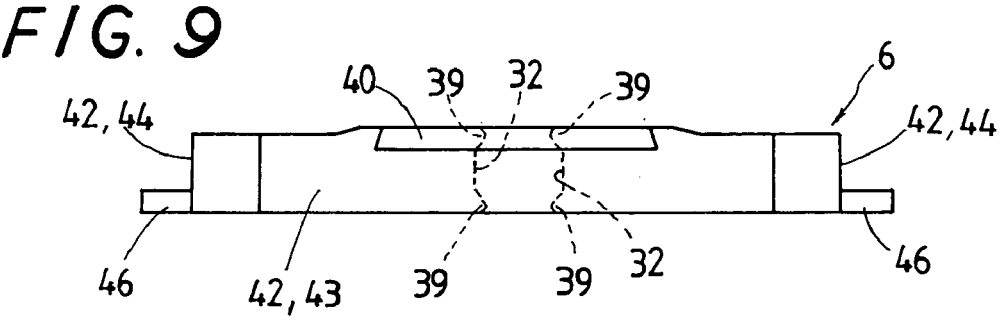
FIG. 9 is a front elevation of the pinion holder of FIG. 8.
Figure 10:
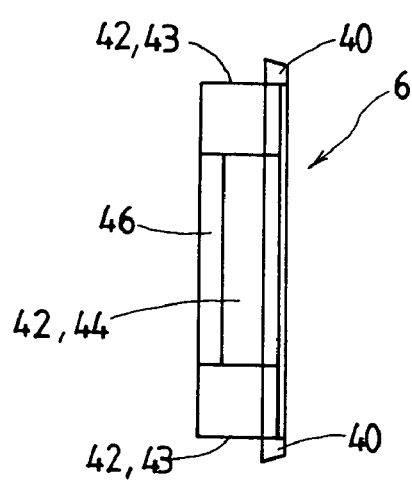
FIG. 10 is a side elevation of the pinion holder of FIG. 8.
Figure 11:
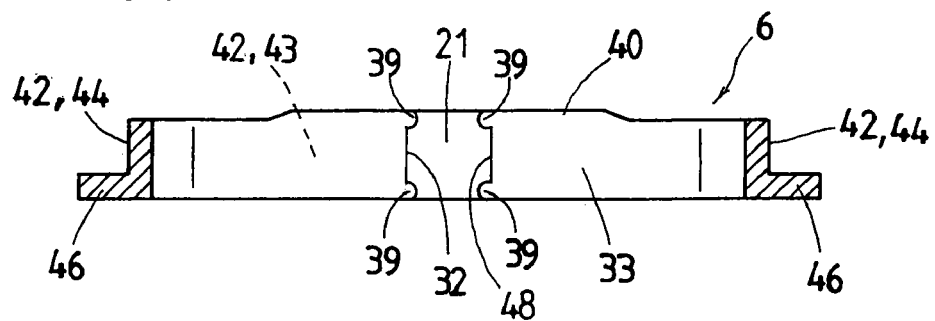
FIG. 11 is a sectional view of the pinion holder of FIG. 8, the view being taken along an area corresponding to the plane lying on the line II—II of that figure.

The cage 3, as seen from FIGS. 4 to 7, is made at lengthwise middle portion thereof with the hook hole 30 to accommodate the pinion holder 6 therein, which is larger in size than a pocket 27 where the cylindrical roller 8 fits therein. Here, the hook hole 30 has a lengthwise dimension equivalent to twice the pocket 27. The hook hole 30, as apparent from FIG. 7, is formed in an octagonal configuration close to the quadrilateral but not exactly quadrilateral, which is derived by leaving four corners of a quadrilateral having any two opposing sides parallel with lengthwise edges of the cage 3. The pinion holder 6 in which the pinion 5 will fit for rotation, as shown in FIGS. 8 to 11, is envisaged to snap into the hook hole 30 and, to this end, includes a flange 46 extending out from any one of fore-and aft end 44 at so lower level as to come into engagement with, for example the reverse 34 of any one fore-and-aft edge defining the hook hole 30, and a snap hook 40 extending sidewise from any one of widthwise opposing sides 43 at so higher level as to come into engagement with, for example the obverse 35 of any one side edge defining the hook hole 30.

Figure 4:
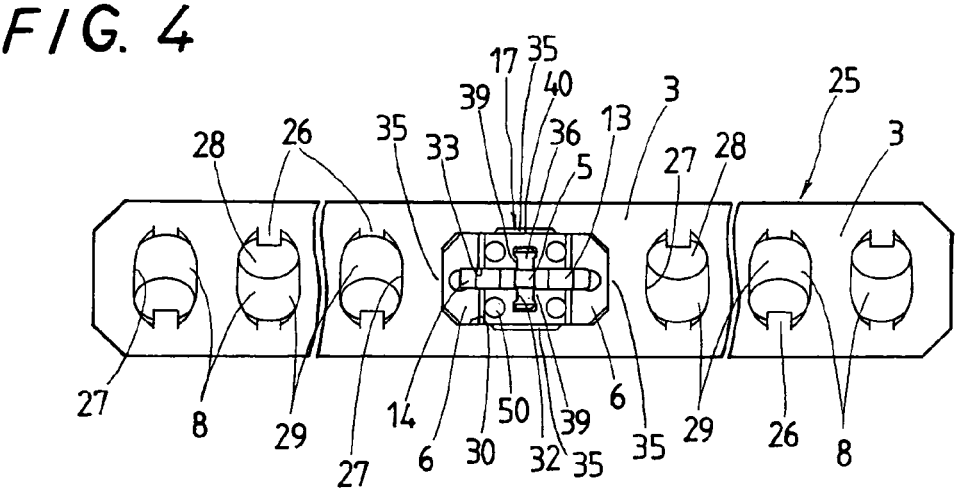
FIG. 4 is a top plan view showing a cage assembly for the finite linear motion guide unit of FIG. 1.

In FIGS. 4 to 6 there is shown in detail a cage assembly 25 to be interposed between the confronting surfaces 15, 16 of the guideway members 1, 2. The cage assembly 25 is mainly comprised of the cage 3 to retain therein more than one rolling element 8 of the cylindrical roller for rotation, the pinion holder 6 installed in the cage 3, and the pinion 5 carried in the pinion holder 6 for free rotation. The rolling element held in the cage 3, as shown in FIGS. 4 to 7, is the cylindrical roller 8 of square in cross section, which is defined by a circular rolling-contact periphery 29 and axially opposite ends 28. Many cylindrical rollers 8 are arranged in linear direction with their own axes intersecting alternately one another. The cage 3 is made of a rectangular sheet extending in the lengthwise direction, which is made with a series of pockets 27 that are arranged at preselected intervals in the longitudinal direction of the cage 3. In the pockets 27 there are provided fingers 26 to retain the cylindrical rollers 8, one to each pocket, with coming into abutment against the axially opposing ends 28 of the rollers 8.

The pinion holder 6 is made therein with an aperture 33 where a disc 13 with teeth around there of the pinion 5 is accommodated for rotation, and bearing recesses 32 to carry loosely therein pinion shafts 36 of the pinion 5 for rotation. On the bearing recesses 32 there are partially raised at 39 to provide bearing surfaces 48 opposite to one another to carry the pinion shafts 39 of the pinion 5 on the raised portions 39 in a rolling-contact manner. When getting the pinion 5 fitting in the pinion holder 6 for rotation, the disc 13 of the pinion 5 is first placed in the aperture 33 and then the pinion shafts 36 of the pinion 5 is forced past beyond the raised portions 39 to snap into in the bearing recesses 32. At this done, the pinion holder 6 has been set in advance in the cage 3, with the flanges 46 on the fore-and-aft ends 44 coming into abutment against the reverse of the cage 3 while the snap hooks 40 on the widthwise sides 43 coming into engagement with the obverse of the cage 3.

Figure 14:
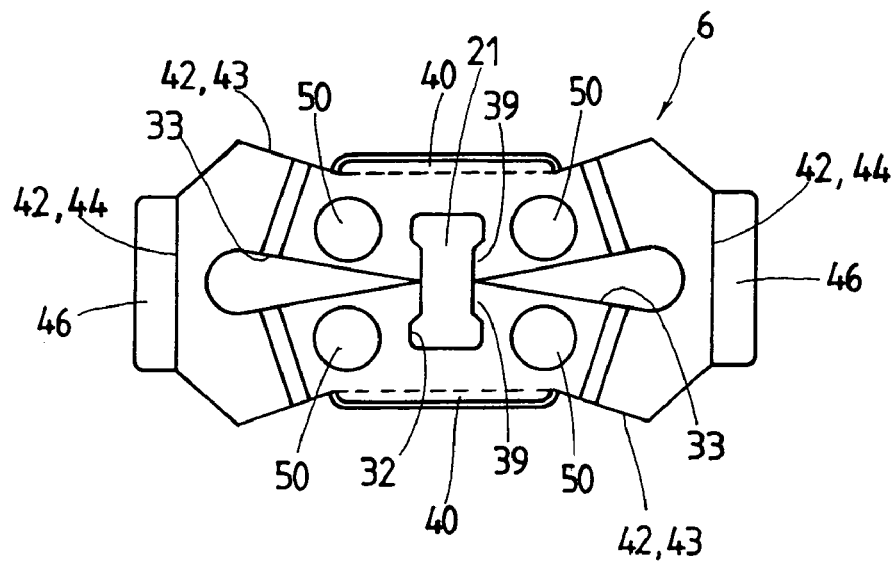
FIG. 14 is a schematic view explaining the pinion holder of FIG. 8, which is shown being subjected to elastic deformation.

For easy fit of the pinion holder 6 in the hook hole 30 with the sidewise snap hooks 40 coming into snap-fit over the edges 35 around the hook hole 30 in the cage 3, the pinion holder 6 is made with working holes 50 used to get the pinion holder 6 deforming elastically so as to collapse or squish widthwise the aperture 33. The pinion holder 6 is first deformed using any tool engaged in the working holes 50 to pull the snap hooks 40 back together in the widthwise inward direction as shown in FIG. 14, followed by being inserted into the hook hole 30 in the cage, starting with the hook sides. After the flanges 46 of the pinion holder 6 have come into abutment against the reverse 34 of the associated fore-and-aft end edges around the hook hole 30 in the cage 3, the tool is disengaged from the working hole 50 to release the pinion holder 6 from the deformed stress, allowing the pinion holder 6 to return to the initial unstressed condition where the pinion holder 6 is allowed to snap into the hook hole 30 with the snap hooks 40 coming into engagement with the obverse 35 of the associated side edges around the hook hole 30. Subsequently, the disc 13 of the pinion 5 is brought into the aperture 33 in the cage 3 and then the pinion shafts 36 of the pinion 5 is forced to snap into in the bearing recesses 32 in the cage 3 to achieve assembly of the pinion 5 in the pinion holder 6. With the assembly stated earlier, the pinion holder 6 could be kept against not only collapsible deformation by the presence of the pinion incorporated therein, but also falling away from the cage 3. The working holes 50, although being provided for rendering manipulation of the tool easier to get the pinion holder 6 deforming, are not always need to fit the pinion holder 6 in the cage 3. As an alternative, just the snap hooks 40 can experience easily any deformation with using no tool so as to snap into the hook hole 30.

Figure 12:
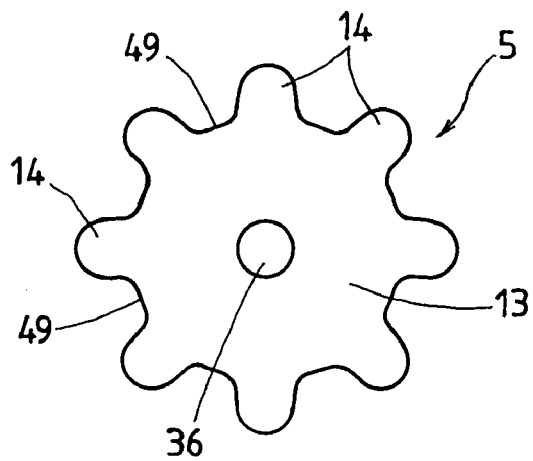
FIG. 12 is a front elevation showing a pinion to provide the means for keeping the cage against wobbling.
Figure 13:
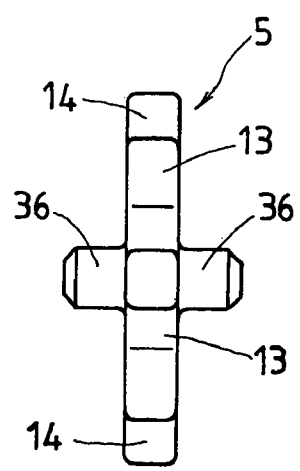
FIG. 13 is a side elevation showing the pinion of FIG. 12.

The pinion 5, as illustrated in FIGS. 12 and 13, has the disc 13 and the pinion shafts 36 extending axially from the opposite sides of the disc 13 to provide a pinion-shaft axis about which the disc 13 rotates. In detail, the pinion 5 is comprised of the disc 13 in which the successive teeth 14 are positioned at a circular regular pitch around the curved periphery of the disc 13 to form slots 49 each separating any two adjacent teeth 14, and the pinion shafts 36 carried for rotation in a pinion chamber 21 defined between widthwise opposing bearing surfaces 48 to provide an axis about which the disc 13 rotates. Each of the successive teeth 14 on the pinion 5, for example, has a specially designed tooth profile instead of any conventional tooth profile of involutes curve. The pinion 5 in FIG. 12 is shown as having eight teeth 14. Moreover, the pinion shafts 36 are planted integrally in the center of the disc 13 in the direction perpendicular to the plane of the discs 13. The teeth 14 on the pinion 5 are designed in the specific tooth profile that is effective to render less the resistance that would be encountered when coming in mating with the teeth on the rack 4, helping make the tooth thickness large, thereby contributing to increasing the strength and stiffness of the teeth and also allowing the tooth to have higher dedendum of gear-tooth so as to make certain of the provision of the tooth form in which there is less possibility of disengagement out of mating with the associated tooth on the rack.

The pinion holder 6 is made in a substantially rectangular configuration in conformity with the hook hole 30 cut in the cage 3. The pinion holder 6 is defined by a periphery 42 made up of a pair of lengthwise longer sides 43 and a pair of shorter ends 44 normal to the longer sides 43. The snap hooks 40 to retain the pinion holder 6 in the cage 3 extend sidewise out of the longer sides 43 of the pinion holder 6 while the flanges 46 to make abutment against the reverse 34 around the hook hole 30 in the cage 3 extend from the shorter ends 44 of the pinion holder 6. The snap hooks 40 to keep the pinion holder 6 in the cage 3, although not shown, may extend from the shorter ends 44 of the pinion holder 6 as opposed to the construction stated just earlier, and correspondingly the flanges 46 to make abutment against the reverse 34 around the hook hole 30 in the cage 3 may be provided to extend from the longer sides 43 of the pinion holder 6.

Figure 15:
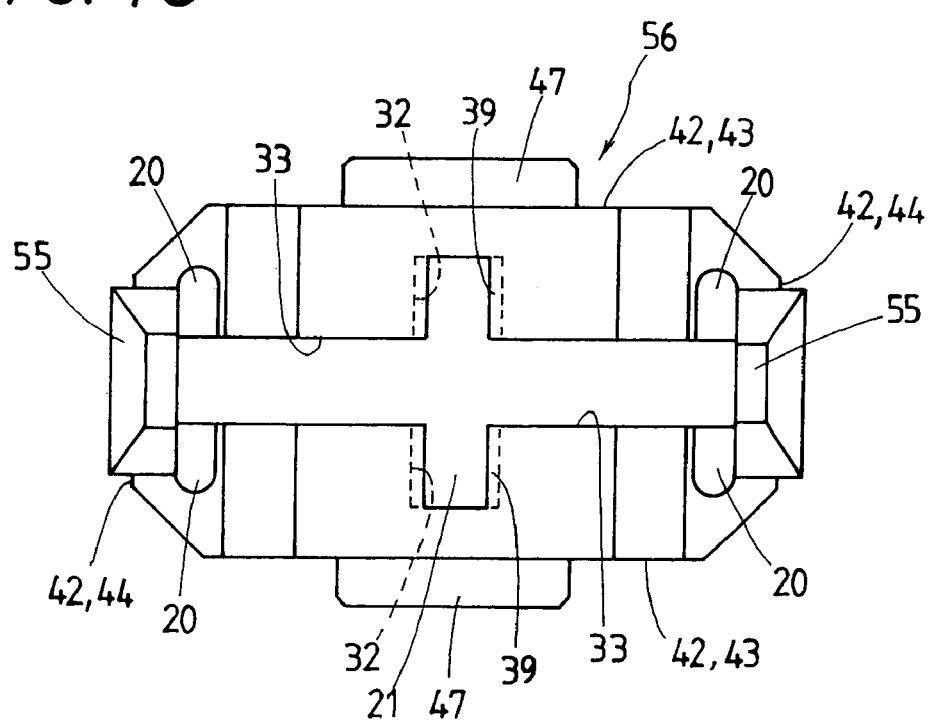
FIG. 15 is a top plan view showing a second embodiment of the pinion holder to provide the means for keeping the cage against wobbling.
Figure 16:
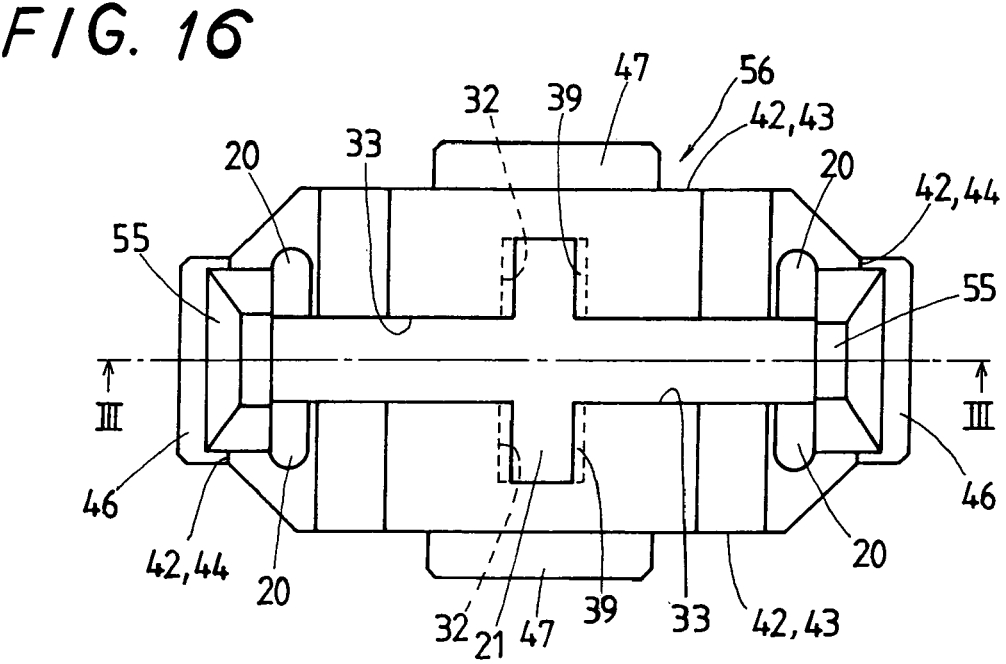
FIG. 16 is a top plan view showing a third embodiment of the pinion holder to provide the means for keeping the cage against wobbling.
Figure 17:
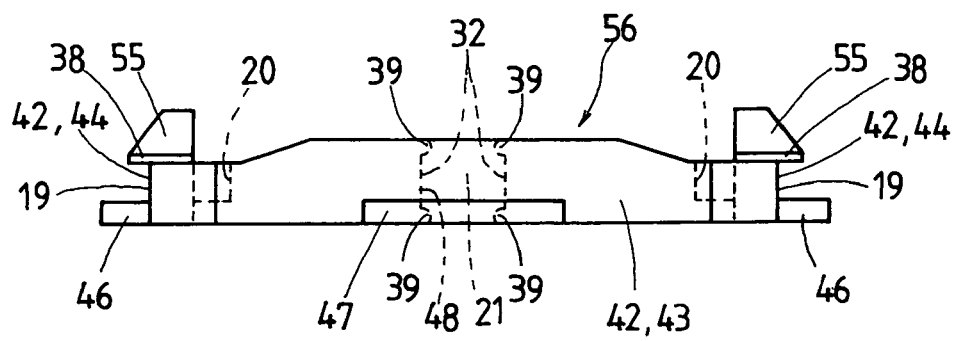
FIG. 17 is a front elevation of the pinion holder of FIG. 16.
Figure 18:
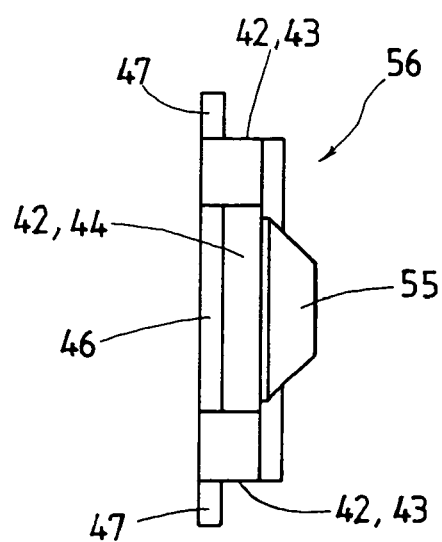
FIG. 18 is a side elevation of the pinion holder of FIG. 16.
Figure 19:
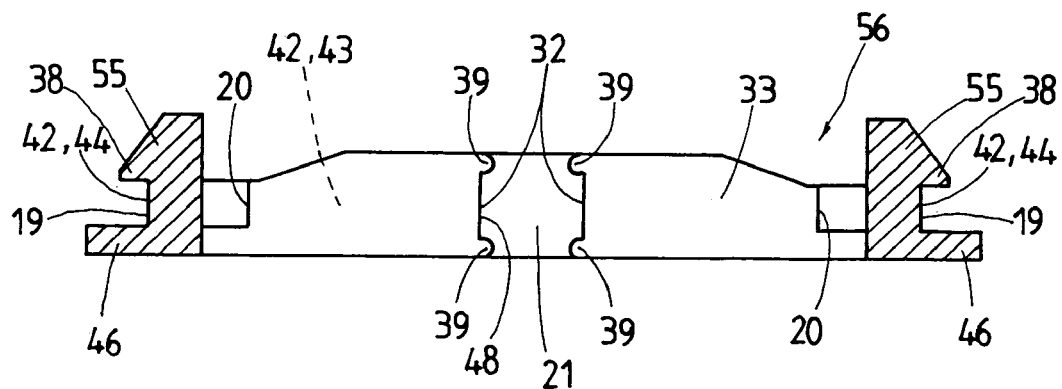
FIG. 19 is a sectional view of the pinion holder of FIG. 16, the view being taken along an area corresponding to the plane lying on the line III—III of that figure.

Next referring to FIG. 15, the second embodiment of the finite linear motion guide unit according to the present invention will be explained below.

Figure 20:
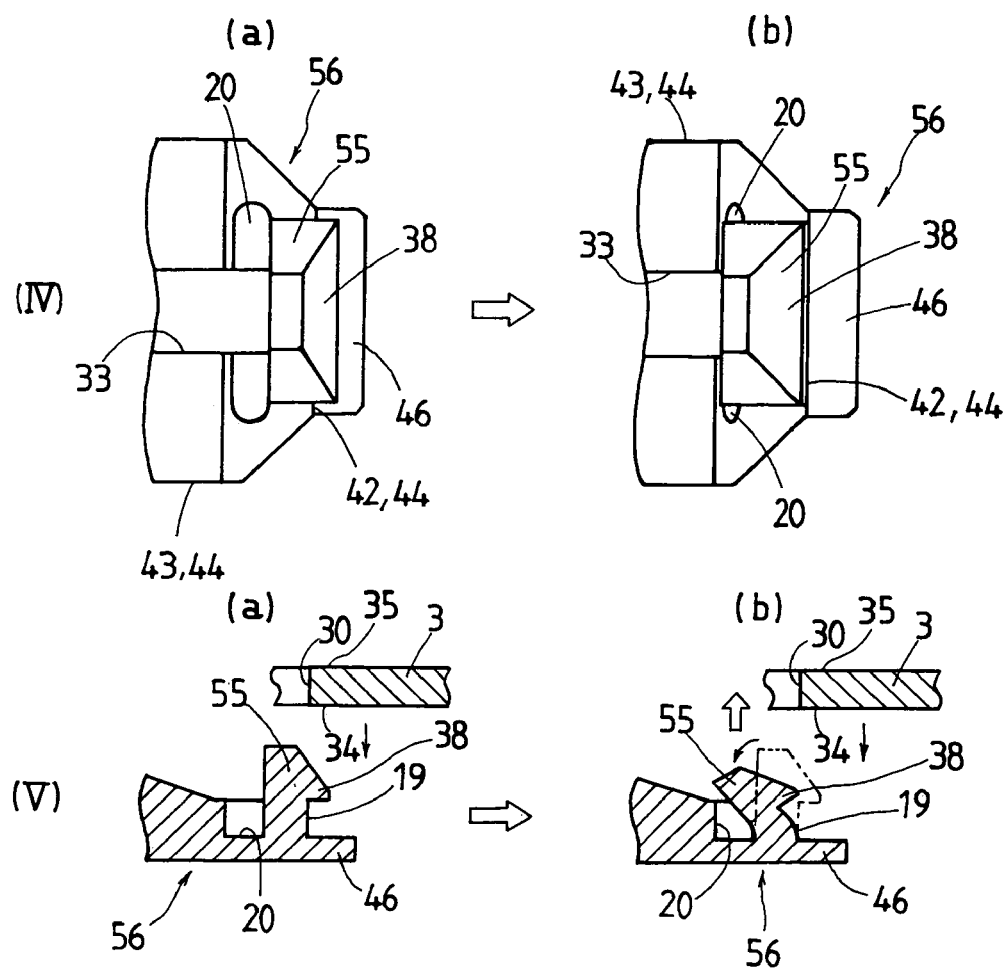
FIG. 20 is a schematic illustration explaining how the pinion holder of the third embodiment of FIGS. 16 and 19, especially, the area of a snap hook is deformed elastically.

With the second embodiment, there is provided a pinion holder 56 made in a substantially rectangular configuration, which is defined by the a periphery 42 made up of a pair of lengthwise longer sides 43 and a pair of shorter ends 44 normal to the longer sides 43. Flanges 47 are made to extend sidewise from only the longer sides 43 at lower level, whereas snap hooks 55 stand on only the shorter ends 44 at higher level. As seen from FIG. 20, moreover, the pinion holder 6 is concaved at 20 next to the snap hooks 55 to make the snap hooks 55 ready to experience elastic deformation. In FIG. 20, there is shown a partial area around the snap hook 55 of the pinion holder 56 at the reference sign (IV) in top plan view and at (V) in cross section. Moreover, the reference sign (a) shows the snap hook 55 before being subjected to elastic deformation and the reference sign (b) is the snap hook 55 that has collapsed elastically under any stress. The pinion holder 56 of this embodiment in which no flange is provided in opposition to the snap hook 55 helps make the mold used to produce it simple in construction and also makes production of the holder much easier.

Next, a third embodiment of the finite linear motion guide unit according to the present invention will be explained later with reference to FIGS. 16 to 20.

A pinion holder 56 of the third embodiment is also made in a substantially rectangular configuration, which is defined by the a periphery 42 made up of a pair of lengthwise longer sides 43 and a pair of shorter ends 44 normal to the longer sides 43. Flanges 46, 47 are formed to extend from both the longer sides 43 and the shorter ends 44 at same lower level, respectively, whereas snap hooks 55 stand on only the shorter ends 44 at higher level in opposition to the associated flange 46, 47. On the fore-and-aft ends 44 of the pinion holder 56, there are each formed a recess 19 between the flange 46 on the shorter end 44 and an engaging jaw 38 of the snap hook 55 to fit over the edge around the hook hole 30 in the cage 3. Moreover, the pinion holder 56, as shown in FIG. 20, has cavities 20 next to the snap hooks 55 to make the snap hooks 55 ready to experience elastic deformation.

When the pinion holder 56 of the third embodiment constructed as stated earlier gets fit in the hook hole 30 in the cage 3, the process of simply fitting the cage 3 in the recess 19 left between the flange 46 and the snap hook 55 of the pinion holder 56 is sufficient. Thus, the pinion holder 56 can snap easily into the hook hole 30 of the cage 3 to fit securely in there. That is to say, the pinion holder 56 can be assembled simply in the hook hole 30 of the cage 3 as the snap hooks 55 on the fore-and-aft ends 44 are allowed to experience with ease the elastic deformation thanks to the presence of the cavities 20 next to the snap hooks 55, as shown in (a) and (b) of FIG. 20. The snap hook 55 of the pinion holder 56, after being first collapsed to bend as shown in FIG. 20-(b), is led through the hook hole 30 in the cage 3, and then released from the elastic bending stress to come into engagement with the obverse 35 of the associated edge around the hook hole 30. Thus, the associated flange 46 comes into abutment against the reverse 34 around the hook hole 30 of the cage 3 so that the cage 3 snaps into the recess 19 on the pinion holder 56. The pinion holder 56 of the third embodiment has the flanges 47, 46 on both the lengthwise sides 43 and the widthwise ends 44 to make certain of more secure fastening of the pinion holder 56 to the cage 3.

Figure 21:
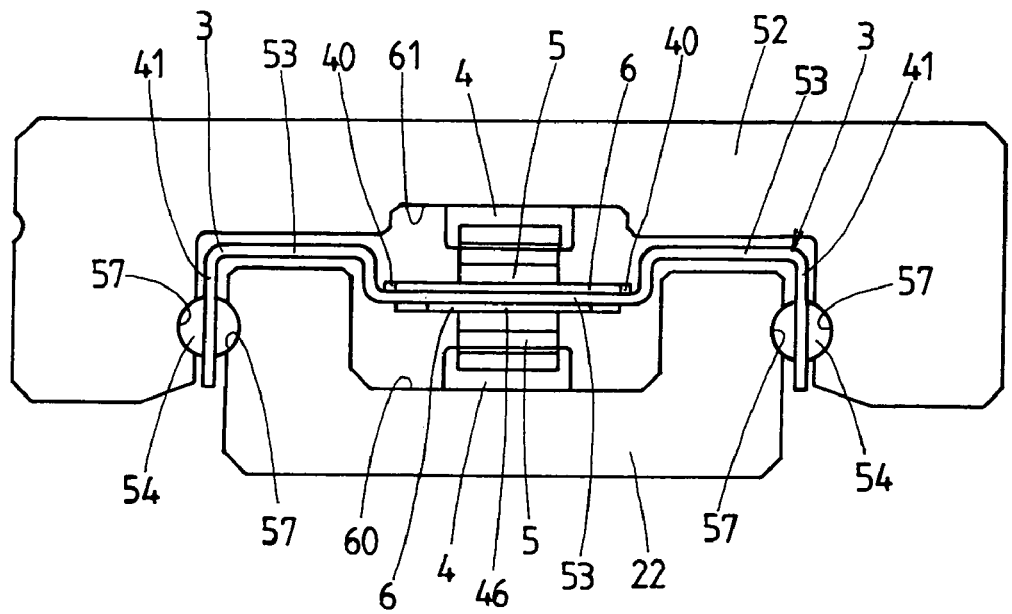
FIG. 21 is a front elevation showing schematically a fourth embodiment of the finite linear motion guide unit.
Figure 22:
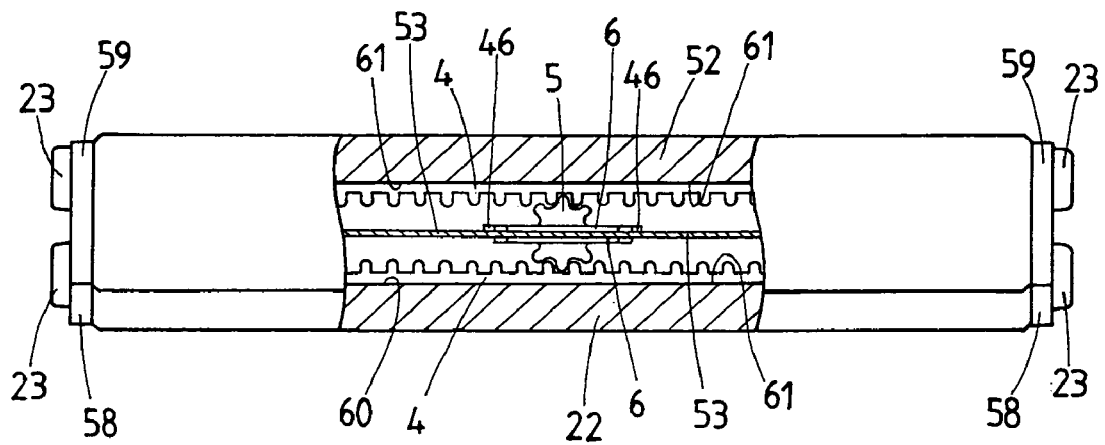
FIG. 22 is a side elevation top plan view, partially broken away, showing the finite linear motion guide unit of FIG. 21.

Referring finally to FIGS. 21 and 22, there is shown the fourth embodiment of the finite linear motion guide unit according to the present invention. The fourth embodiment discussed later is envisaged to prove that the means for keeping the cage against wobbling, or the rack-and-pinion arrangement 17, is not restricted in application thereof to between the confronting raceway grooves 10 of the paired guideway members 1, 2 as having stated earlier in the first and second embodiments, but can be applied widely to any other sheet cage 3 whenever the cage allows to make the hook hole to fit the pinion holder therein. With the fourth embodiment, the cage 3 is composed of sidewise opposing retainer webs 41 containing rolling elements or balls 54 in FIG. 21 therein, and a connecting web 53 integral with the retainer webs 41.

In the fourth embodiment, any one of the guideway members is a track rail 22 while the other is a slider 52. Both the track rail 22 and the slider 52 are made on their confronting surfaces with raceway grooves 57, which provide raceways 7, one to each of the sidewise opposing sides, to allow the rolling elements of balls 54 running through there. The cages 3 to retain the balls 54 are placed in the raceways 7, one to each raceway, and joined together with a connecting web 53. Moreover, both the track rail 22 and the slider 52 are made with lengthwise recesses 60, 61, which lie midway between the sidewise opposing raceways 7 in opposition to one another to accommodate therein the racks 4, one to each recess. The pinion holder 6 for the means 17 to keep the cage against wobbling is arranged in the connecting web 53 along the widthwise middle of the recesses 60, 61. Fit of the pinion holder 6 in the connecting web 53 can be completed in the same snap-fit manner as in the first embodiment stated earlier. On forward and aft ends of both the track rail 22 and the slider 52, end plates 58, 59 serving as stoppers to keep the cage 3 against escape out of the track rail 22 and the slider 52 are fastened with end screws 23.

While the present invention has been disclosed in connection with the preferred embodiments thereof, it should be understood that other embodiments might be fall within the spirit and scope of the invention, as defined by the following claims.

What is claimed is:

1. A linear motion guide unit; comprising a pair of guideway members lying movable relatively to one another and having confronting raceway grooves on their sides extending in lengthwise direction, a cage retaining more than one rolling element in a raceway defined between the raceway grooves on the guideway members, the cage being made in a form of sheet extending the lengthwise direction, and means for keeping the cage against wobbling;
wherein the means for keeping the cage against wobbling is comprised of a pinion holder fit in a hook hole in the cage after once having been made deformed, racks lying on the guideway members, and a pinion provided with teeth mating with the racks and installed in the cage for rotation.

2. A linear motion guide unit constructed as defined in claim 1, wherein the pinion holder is made therein with an aperture where a disc with teeth around there of the pinion is accommodated for rotation, and bearing recesses to carry loosely therein pinion shafts of the pinion for rotation.

3. A linear motion guide unit constructed as defined in claim 1, wherein the pinion holder has a flange extending out of a periphery of pinion holder to come into abutment against any one surface of an edge around the hook hole cut in the cage, and an snap hook extending from the periphery of the pinion holder to make engagement with another surface of the edge around the hook hole cut in the cage after deformation of the pinion holder.

4. A linear motion guide unit constructed as defined in claim 3, wherein the pinion holder is made in a substantially rectangular configuration, which is defined by the periphery of a pair of lengthwise longer sides and a pair of shorter ends normal to the longer sides, and the flange extends from any one of the longer side and shorter end at a level coming into abutment against the one surface of the edge around the hook hole while the snap hook is out of the other at another level coming into engagement with the another surface of the edge around the hook hole.

5. A linear motion guide unit constructed as defined in claim 4, wherein the flange extends from the other of the longer side and shorter end at the another level coming into abutment against the another surface of the edge around the hook hole.

6. A linear motion guide unit constructed as defined in claim 3, wherein the pinion holder is made with a working hole used to get the pinion holder deforming elastically so as to squish the aperture to snap the snap hook into engagement with the another surface of the edge around the hook hole.

7. A linear motion guide unit constructed as defined in claim 3, wherein the pinion holder has a cavity next to the snap hook to make the snap hook ready to experience elastic deformation.

8. A linear motion guide unit constructed as defined in claim 1, wherein the pinion is comprised of the disc which the successive teeth are positioned at a circular regular pitch around the disc to form slots each separating any two adjacent teeth, and the pinion shafts carried for rotation in the pinion holder to provide an axis about which the disc rotates.

9. A linear motion guide unit constructed as defined in claim 1, wherein the racks lie lengthwise in relief valleys cut deep in the raceway grooves in the guideway members.

10. A linear motion guide unit constructed as defined in claim 9, wherein the rack is composed of successive teeth spaced apart from each other at preselected intervals to allow the teeth to mesh with the pinion, and side walls extending in longitudinal direction on sidewise opposite sides of the teeth, one to each side, to connect the successive teeth together with one another.

11. A linear motion guide unit constructed as defined in claim 1, wherein any one of the guideway members is a track rail while the other is a slider, both the track rail and the slider being made on their confronting surfaces with raceway grooves, which provide a pair of raceways allow the rolling elements running through there, and the cages to retain the rolling elements are placed in the raceways, one to each raceway, and joined together with a connecting web where there is provided the pinion holder for the means to keep the cage against wobbling.

12. A linear motion guide unit constructed as defined in claim 11, wherein both the track rail and the slider are made with lengthwise recesses, which lie midway between the sidewise opposing raceways in opposition to one another to accommodate therein the racks for means to keep the cage against wobbling.

13. A linear motion guide unit constructed as defined in claim 1, wherein the rolling elements are either cylindrical rollers or balls, which are allowed to run through over a pair of rolling-contact surfaces formed in the raceway grooves of the guideway members.

14. A linear motion guide unit constructed as defined in claim 1, wherein the guideway members have stoppers to keep the cage against falling away from the guideway members.

15. A linear motion guide unit constructed as defined in claim 1, wherein the guideway members have fastening means to mount any moving bodies including tables, mounting parts and so on or any stationary bodies including beds and so on thereon.

* * * * *